United States Patent [19]

Strickland

[11] 4,295,531

[45] Oct. 20, 1981

[54] AUGER-EQUIPPED PLOW

[76] Inventor: Hubert E. Strickland, 2205 Ardmore Ave., Chesapeake, Va. 23324

[21] Appl. No.: 91,652

[22] Filed: Nov. 5, 1979

[51] Int. Cl.³ ...................... A01B 33/04; B62D 51/04
[52] U.S. Cl. ...................................... 172/42; 172/63; 172/108; 172/116
[58] Field of Search .................. 172/42, 43, 108, 109, 172/57, 58, 63, 112, 113, 116; 37/81; 299/39, 55

[56] References Cited

U.S. PATENT DOCUMENTS

| | | | |
|---|---|---|---|
| 1,071,576 | 8/1913 | Reed | 172/116 |
| 1,419,953 | 6/1922 | Binmore | 172/57 |
| 1,573,637 | 2/1926 | Drozd | 172/108 X |
| 1,592,825 | 7/1926 | Gardner et al. | 172/42 |
| 1,835,670 | 12/1931 | Popp | 172/108 X |
| 2,051,443 | 8/1936 | Gravely | 172/43 X |
| 2,574,353 | 11/1951 | Singer | 172/42 |
| 2,643,599 | 6/1953 | Wharton | 172/42 X |
| 2,876,085 | 3/1959 | Starrett | 172/42 |
| 3,102,349 | 9/1963 | Thomson | 172/108 X |
| 3,714,990 | 2/1973 | Tomik | 172/58 |
| 4,121,668 | 10/1978 | Miner | 172/42 |

FOREIGN PATENT DOCUMENTS

| | | | |
|---|---|---|---|
| 173888 | 2/1953 | Austria | 172/42 |
| 267928 | 1/1969 | Austria | 172/43 |
| 454085 | 1/1928 | Fed. Rep. of Germany | 172/108 |
| 643634 | 5/1928 | France | 172/108 |
| 324776 | 2/1935 | Italy | 172/42 |
| 20524 | 7/1913 | United Kingdom | 172/58 |

Primary Examiner—Richard T. Stouffer
Attorney, Agent, or Firm—Norman B. Rainer

[57] ABSTRACT

A ground working implement is provided wherein a motor driven auger is positioned beneath and partially enclosed by a truncated V-shaped plowshare. The auger contributes to the forward movement of the implement. The space between the auger and the plowshare causes clods of soil to be uniformly broken. Mechanical features are provided, in association with a frame structure, to guide the implement, to adjust the height of the auger, and to control the operation of a motor or engine.

3 Claims, 3 Drawing Figures

AUGER-EQUIPPED PLOW

BACKGROUND OF THE INVENTION

This invention relates to an improved ground working implement of the motor driven type, and in particular to a plow or cultivator having a horizontally disposed auger or screw positioned slightly below the surface of the soil and rotated by a motor, thereby providing propelling means for the implement.

Considerable power is required to propel a ground treating implement such as a plow through the soil. Such power is generally provided by traction means such as wheels, tractor belts, or the feet of animals or humans acting upon the ground and thereby directing force toward the implement. Said force directed toward the implement is generally directed downwardly from a site above the traction means. Accordingly, the force is not efficiently used because only a vector compartment of its total magnitude is directed parallel to the ground-breaking tool.

If the propelling means can be positioned to provide force directly in line with the groundworking tool, the efficiencies thereby achieved may allow a reduction in the total weight of the implement and its required driving power. One approach disclosed for providing a driving force in line with the groundbreaking tool has been the use of motor or engine driven auger devices as disclosed in U.S. Pat. No. 2,574,353 to Singer; U.S. Pat. No. 2,876,850 to Starrett; U.S. Pat. No. 2,643,599 to Wharton; and U.S. Pat. No. 4,121,668 to Miner. However, the forward-urging power provided by said auger-equipped implements is considerably dependent upon the nature of the earth being worked upon. Also, the auger itself has not generally been efficient in breaking the soil and raising portions thereof to create a tilling effect.

It is accordingly an object of this invention to provide a ground working implement comprising a motor-driven auger positioned below ground level and adapted to cause forward propulsion of said implement. It is a further object of the present invention to provide an implement of the aforesaid nature having improved efficiency in breaking up the soil being worked upon and providing greater reliability of forward propulsion. These objects and other objects and advantages of the invention will be apparent from the following description.

SUMMARY OF THE INVENTION

The above and other beneficial objects and advantages are accomplished in accordance with the present invention by an improved mechanically driven ground working implement comprising a horizontally disposed rigid elongated framework, front and rear wheels rotatably mounted on said framework adjacent the extremities thereof, a pair of control handles attached to said framework and extending upwardly and rearwardly therefrom, a power source such as a fuel-powered engine mounted on said framework between said wheels, drive means extending downwardly from said power source to engagement with a forwardly directed auger device pendantly supported by said framework on an axis substantially parallel thereto, and a truncated hollow plowshare supported by said framework in a disposition closely above said auger device.

BRIEF DESCRIPTION OF THE DRAWINGS

For a fuller understanding of the nature and objects of the invention, reference should be had to the following detailed description taken in connection with the accompanying drawing forming a part of this specification and in which similar numerals of reference indicate corresponding parts in all the figures of the drawing.

DETAILED DESCRIPTION OF THE PREFERRED EMBODIMENT

Figure 1:
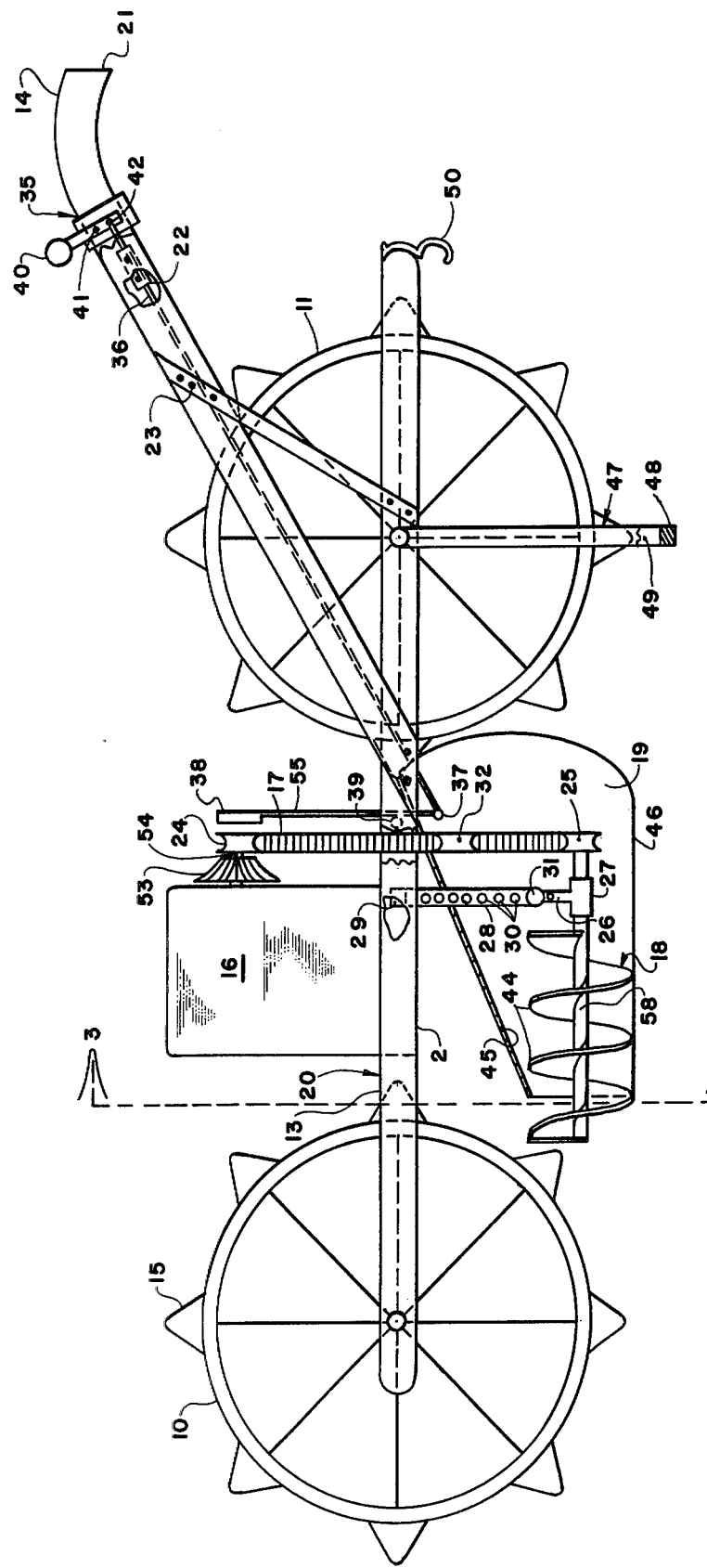
FIG. 1 is a side view partially in section of an embodiment of the apparatus of the present invention with portions cut away to reveal internal detail.
Figure 2:
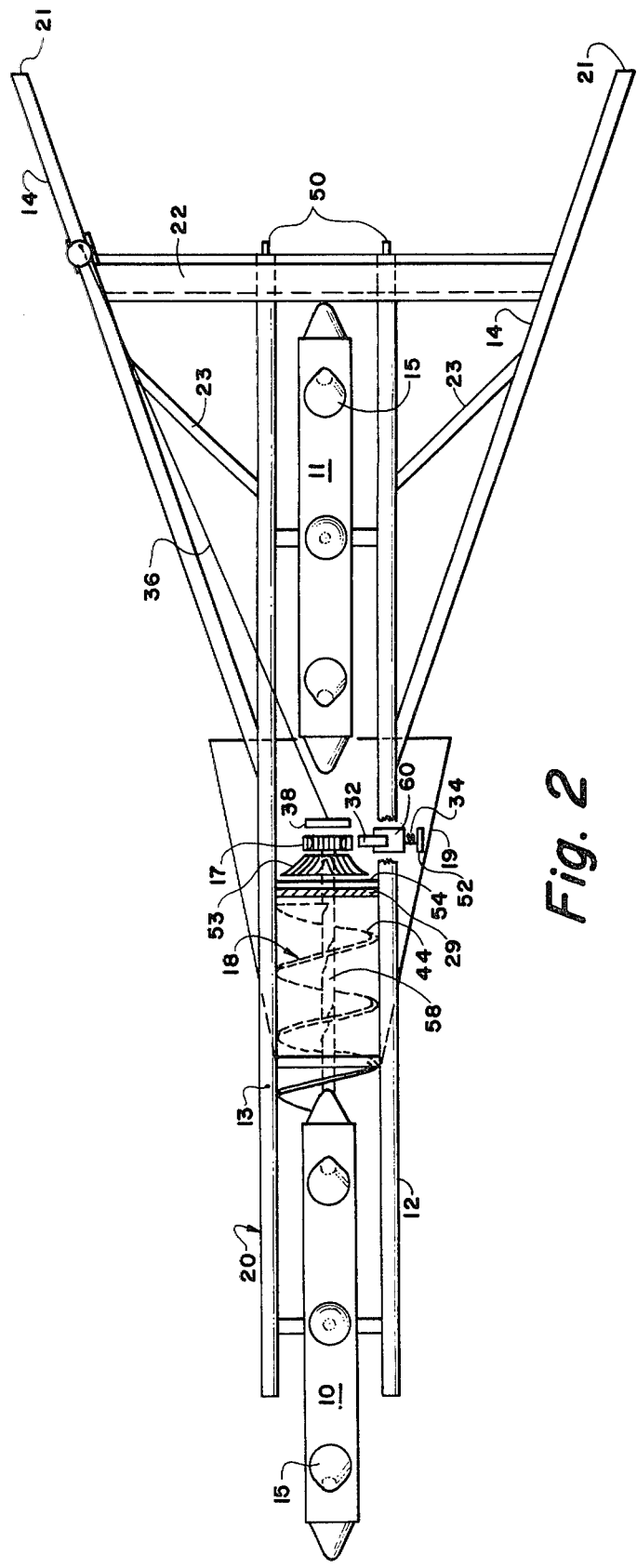
FIG. 2 is a top view of the apparatus of FIG. 1.

Referring to FIGS. 1 and 2, the apparatus is seen to be comprised of front wheel 10 and rear wheel 11 rotatably harnessed between parallel side-by-side beam members 12 and 13 of framework 20. Each wheel contains spiked protrusions 15 for improved traction over the earth. A pair of diverging control handles 14 extent upwardly from attachment with said beam members at a site forward of rear wheel 11. The rearward extremities 21 of said handles extend rearwardly beyond rear wheel 11. A cross bar 22 extends between handles 14 for structural support thereof. Upright support struts 23 extend from attachment at the rearward extremity of said beam members to attachment with the corresponding handle 14, thereby providing an even greater sturdiness to said handles.

Mounted about mid-way along framework 20 is a power source in the form of gasoline engine 16 and associated continuous loop power transmission means such as chain or belt 17 which engages drive wheel 24 and descends below framework 20 to engagement with a driven wheel 25 fixedly attached to the rear extremity of substantially horizontally oriented screw or auger 18. Said screw 18 is journalled to bushing 27 held by support rod 26 which adjustably telescopes into vertical sleeve housing 28 pendant from cross-member 29 spanning beam members 12 and 13. The actual elevation of screw 18 can be adjusted by raising or lowering support rod 26, and locking said rod 26 into position within sleeve housing 28 by means of a locking pin 31 adapted to penetrate matching holes 30 in said support rod 26 and sleeve housing 28.

Figure 3:
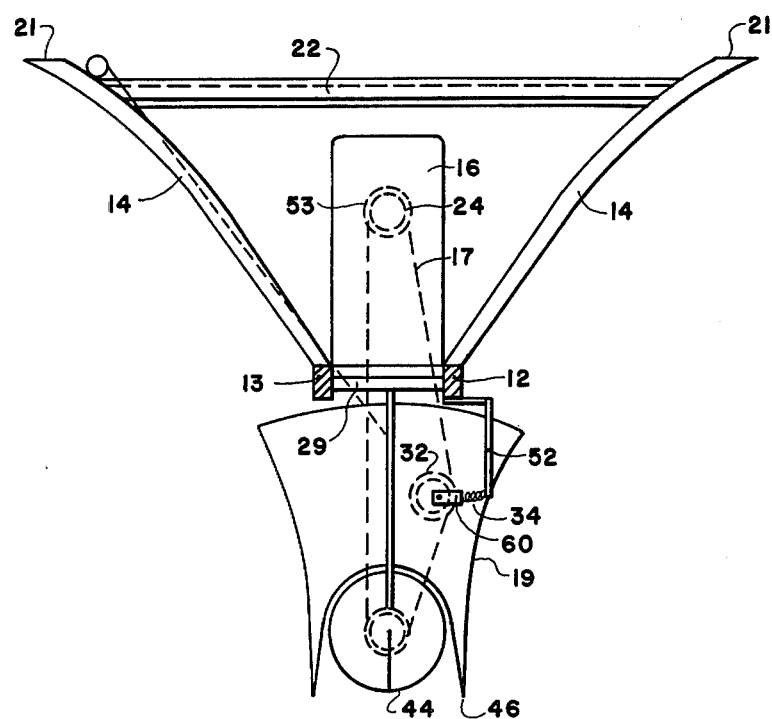
FIG. 3 is a sectional view taken along the lines 3—3 of FIG. 1.

In order to maintain power transmission means 17 taut regardless of the position of bushing 27, idler wheel 32 shown in FIGS. 1 and 3, which rotates within holding yoke 60 in a vertical plane, is caused to bring corrective tension to bear against said transmission means by spring 34 extending between yoke 60 and bracket 52 associated with beam member 12.

Positioned generally above auger 18 and in close proximity thereto is the V-shaped plow structure 19. The plow 19 is shaped substantially as a conventional turning plowshare with associated moldboards or wings except that the leading portion of the plow is truncated to permit the auger to contact the soil preceeding the plow, and the plow is of generally hollow construction to accommodate the auger.

Control means 35 associated with one of handles 14 is comprised of a levered knob mechanism 40 which engages a rigid control rod 36 extending to moveable pivot 37. Vertical control rod 55 attached to pivot 37 coacts with stationary pivot 39 attached to framework 20 in a manner to move attached control plate 38 into positioning contact with drive wheel 24. When the knob 40 of control means 35 is pushed forward, it causes motion about pivots 41 and 42 to raise rod 36. In so doing, the upper extremity of vertical control rod 55 is caused to move forward, causing control plate 38 to urge drive wheel 24 into engagement with clutch plate 53 fixedly attached to engine shaft 54. Such action causes engine 16 to activate transmission means 17 which rotates auger 18. Cessation of rotation of said auger is achieved by pulling knob 40 rearward.

The auger may be of tapered configuration to fit closely and uniformly within the confines of the tapered hollow plow 19. In other embodiments of said auger, however, the outer edges 44 of the spiralled blade member may be uniformly displaced from the center core 58, thereby lying in a circular cylindric surface coaxial with said core, such embodiment being illustrated in the drawings. The pitch of the auger may be constant, or graded so as to have a greater relative number of turns at the forward end. The positioning of the auger is such that its outer edges 44 are adjustably located between about 1" and 4" from the upper inside surface 45 of plow 19. The lowermost portions of outer edge 44 of said auger are preferably at a level adjacent the lowermost edge 46 of plow 19.

A positionable stand 47 may be utilized having a flat bottom member 48 and upright sides 49 which are pivotably attached at their upper extremities to beam members 12 and 13. The purpose of the stand 47, when in downward position, is to support the apparatus in an upright position. When not in use, said stand can be pivoted rearwardly so that flat bottom member 48 will engage with holding clasps 50 mounted adjacent the extremities of beam members 12 and 13.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A mechanically driven ground working implement comprising:
    (a) a horizontally disposed rigid elongated framework,
    (b) front and rear wheels rotatably mounted on said framework adjacent the opposite extremities thereof, said wheels provided with peripherally mounted projections which interact with the ground to provide traction for said implement,
    (c) a pair of control handles attached to said framework and extending upwardly and rearwardly therefrom in symmetrically opposed relationship,
    (d) a power source in the form of a fuel-powered engine mounted on said framework between said wheels,
    (e) drive means extending downwardly from said power source,
    (f) forwardly and substantially horizontally directed auger means pendantly supported by said framework said auger means being comprised of a center core and spiralled blade member having an outer edge, the rearward extremity of said auger means being engaged by said drive means,
    (g) means to adjust the elevation of said auger means, and
    (h) a truncated hollow V-shaped plowshare supported by said framework in a disposition closely above said auger means, said plowshare having an inside surface and a forward end,
    (i) the forward end of said auger protruding in front of the forward end of said plowshare,
    (j) the outer edge of said blade member being adjustably located between about 1" and 4" from the inside surface of said plowshare, and the lowermost portion of said outer edge being at a level adjacent the lowermost portion of said plowshare.

2. The implement of claim 1 wherein control means are associated with one of said handles to control the transmission of rotative power from said engine to said auger means.

3. The implement of claim 1 provided with a positionable stand capable of supporting the implement in an upright disposition.

* * * * *